United States Patent [19]
Araki et al.

[11] Patent Number: 5,914,923
[45] Date of Patent: Jun. 22, 1999

[54] TILT SERVO SYSTEM

[75] Inventors: Yoshitsugu Araki; Junichi Furukawa, both of Tsurugashima, Japan

[73] Assignee: Pioneer Electronic Corporation, Tokyo-To, Japan

[21] Appl. No.: 08/986,061

[22] Filed: Dec. 5, 1997

[30] Foreign Application Priority Data

Dec. 9, 1996 [JP] Japan .................................. 8-344540

[51] Int. Cl.$^6$ ................................................. G11B 7/095
[52] U.S. Cl. ........................... 369/44.32; 369/54; 369/58; 369/112
[58] Field of Search ............................ 369/44.23, 44.24, 369/44.32, 44.34, 54, 58, 112

[56] References Cited

U.S. PATENT DOCUMENTS

| | | | |
|---|---|---|---|
| 5,416,757 | 5/1995 | Lueke et al. | 369/44.23 |
| 5,729,510 | 3/1998 | Kasahara et al. | 369/44.23 X |
| 5,754,512 | 5/1998 | Komma et al. | 369/112 |

OTHER PUBLICATIONS

Patent Abstracts of Japan, for JP 9–35315 (published Feb. 7, 1997).

*Primary Examiner*—W. R. Young
*Attorney, Agent, or Firm*—Ladas & Parry

[57] ABSTRACT

A tilt servo system for performing a servo control in order to compensate an aberration caused by a tilt of an optical disc, having: a pickup for radiating a laser beam onto each track of the optical disc, the pickup having a laser light source for emitting the laser beam, an objective lens for converging the emitted laser beam on the optical disc, and a liquid crystal panel positioned on an optical axis of the emitted laser beam in order to compensate the aberration; a tilt sensor for detecting the tilt of the optical disc, and for outputting a detection signal corresponding to the tilt of the optical disc; a storage device for storing the detection signal corresponding to the tilt of an $(N-\alpha)^{th}$ track of the optical disc outputted from the tilt sensor; a controller for controlling the liquid crystal panel on the basis of the detection signal corresponding to the tilt of the $(N-\alpha)^{th}$ track of the optical disc stored in the storage device when the pickup radiates the laser beam onto an $N^{th}$ track of the optical disc.

9 Claims, 5 Drawing Sheets a b c d e f

TILT SERVO SYSTEM

BACKGROUND OF THE INVENTION

1. Field of the Invention

The present invention generally relates to a control system of an optical pickup to be used for an optical disc reproducing apparatus, and more particularly relates to a tilt servo system to cope with a tilt of an optical disc.

2. Description of the Related Art

A DVD is an optical disc whose diameter is 12 [cm] similarly to a CD (Compact Disc). However, in the recording density, the DVD is 6 to 8 times as high as the CD. Therefore, the DVD has the ability to record a large amount of digital information, such as animation, information using in a computer or the like, thereon. Thus, the DVD is recently attracted as a digital recording medium having a large amount of recording capacity.

Further, in order to increase the recording capacity, a laser light source used for the DVD has a wavelength of 650 [nm]. In contrast, a laser light source used for the CD has a wavelength of 780 [nm]. Thus, the wavelength of the laser light source used for the DVD is shorter than that of the laser light source used for the CD. Further, an objective lens used for the DVD has a numerical aperture of 0.6. In contrast, an objective lens used for the CD has a numerical aperture 0.45. Thus, the numerical aperture of the objective lens used for the DVD is greater than that of the objective lens used for the CD. Furthermore, in order to increase the recording capacity, an MPEG2, which is a kind of a data compression algorithm, is used for the DVD. Therefore, the digital information of 5 Gbyte can be recorded on one side of the DVD. Thus, the high density recording is realized by the DVD. Furthermore, in order to reproduce the digital information recorded on the optical disc in the high density, a diameter of a spot of a laser beam used for the DVD is very small compared with the CD.

As mentioned above, in the reproducing apparatus used for the DVD, the wavelength of the laser light source is relatively short and a numerical aperture is relatively large. Therefore, a wave aberration is easily occurred when a part of the optical disc is slightly curved or leaned, and a margin of a tilt angle is reduced. Therefore, it is difficult to prevent the occurrence of the wave aberration. In addition, the tilt angle means a difference between a plane of the optical disc and a plane perpendicular to an optical axis of an optical pickup.

In order to compensate the wave aberration, it is attempted to use a liquid crystal panel in an optical disc reproducing apparatus. Namely, the liquid crystal panel is positioned on an optical path of a laser beam radiated from a laser light source to an optical disc. Further, a tilt sensor detects a tilt of the optical disc as a tilt error, and outputs a control voltage corresponding to the tilt error. The liquid crystal of the liquid crystal panel produces a phase difference in the laser beam on the basis of the control voltage when the laser beam goes through the liquid crystal panel. Thus, the wave aberration can be compensated.

However, a liquid crystal generally has a response delay. The liquid crystal does not perform at the same time that a control voltage is supplied thereto. Namely, the liquid crystal performs after the elapse of the response delay time. Thus, a tilt error delayed for the response delay time is used for the compensation of the wave aberration. That is to say, the past tilt error is used for the compensation of the wave aberration. If the change of the tilt error is sufficiently slow compared to the response delay time, the response delay does not affect, so that the wave aberration can be compensate correctly. However, the change of the tilt error is fast compared to the response delay time, the response of the liquid crystal panel cannot follow the change of the tilt error. Therefore, the wave aberration cannot compensated correctly.

SUMMARY OF THE INVENTION

It is therefore an object of the present invention to provide a tilt servo system of an optical disc reproducing apparatus which can correctly compensate aberration caused by a tilt of an optical disc without an influence of a response delay of a liquid crystal.

According to the present invention, the above mentioned object can be achieved by a tilt servo system for performing a servo control in order to compensate an aberration caused by a tilt of an optical disc, having: a pickup for radiating a laser beam onto each track of the optical disc, the pickup having a laser light source for emitting the laser beam, an objective lens for converging the emitted laser beam on the optical disc, and a liquid crystal panel positioned on an optical axis of the emitted laser beam in order to compensate the aberration; a tilt sensor for detecting the tilt of the optical disc, and for outputting a detection signal corresponding to the tilt of the optical disc; a storage device for storing the detection signal corresponding to the tilt of an $(N-\alpha)^{th}$ track of the optical disc outputted from the tilt sensor; a controller for controlling the liquid crystal panel on the basis of the detection signal corresponding to the tilt of the $(N-\alpha)^{th}$ track of the optical disc stored in the storage device when the pickup radiates the laser beam onto an $N^{th}$ track of the optical disc.

For example, when information recorded on the optical disc are read, the optical disc is rotated, and the laser beam is emitted to the rotating optical disc by the pickup. By the laser beam emitted by the pickup, the light spot is formed on the rotating optical disc. Further, the light spot is shifted on the rotating optical disc in the radial direction of the rotating optical disc. Therefore, information arranged on the optical disc in a spiral form, a coaxial form, etc. are irradiated by the laser beam, and the information are read. Namely, for everyone rotation of the optical disc, the light spot is shifted to the next track, and information recorded on its track are read. In this manner, information recorded on each tracks of the optical disc are read one after another.

Here, the amount of the tilt of the optical disc is not greatly changed in some tracks adjacent to each other on the sane radius of the optical disc, because the interval between the tracks adjacent to each other is very small. Therefore, the tilt of the $N^{th}$ track of the optical disc is substantially equal to the tilt of the $(N-\alpha)^{th}$ track of the optical disc. The $(N-\alpha)^{th}$ track means a track adjacent to the $N^{th}$ track.

From the point of view, the detecting signal corresponding to the tilt of the $(N-\alpha)^{th}$ track of the optical disc outputted from the tilt sensor is stored in the storage device, and the liquid crystal panel controlled on the basis of the detection signal corresponding to the tilt of an $(N-\alpha)^{th}$ track stored in the storage device, when the pickup radiates the laser beam onto the $N^{th}$ track of the optical disc. Thus, the aberration caused by the tilt of the optical disc is compensated by the liquid crystal panel.

Further, since the detecting signal corresponding to the tilt of the $(N-\alpha)^{th}$ track is stored before the pickup radiates the laser beam onto the $N^{th}$ track, the controller can control the liquid crystal panel by using the detecting signal corresponding to the tilt of the $(N-\alpha)^{th}$ track so as to remove the response delay time of the liquid crystal panel. Thus, the aberration caused by a tilt of an optical disc can be correctly compensated without an influence of the response delay time of the liquid crystal panel.

Furthermore, in case that the controller controls the liquid crystal panel by outputting the detection signal corresponding to the tilt of an $(N-\alpha)^{th}$ track of the optical disc to the liquid crystal panel, and the controller advances an output timing of the detection signal by a time corresponding to a response delay time of the liquid crystal panel. Therefore, the response delay time can be canceled, so that the aberration caused by a tilt of an optical disc can be correctly compensated.

Further, in case that the response delay time changes with ambient temperature of the liquid crystal panel, the ambient temperature of the liquid crystal panel is measured by using a temperature sensor, and the output timing of the detection signal stored in the storage device is changed according to the measured ambient temperature of the liquid crystal panel by the controller. Thus, if ambient temperature of the liquid crystal panel changes, the response delay time can be removed, and the aberration caused by a tilt of an optical disc can be correctly compensated.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

1. First Embodiment

Figure 1:
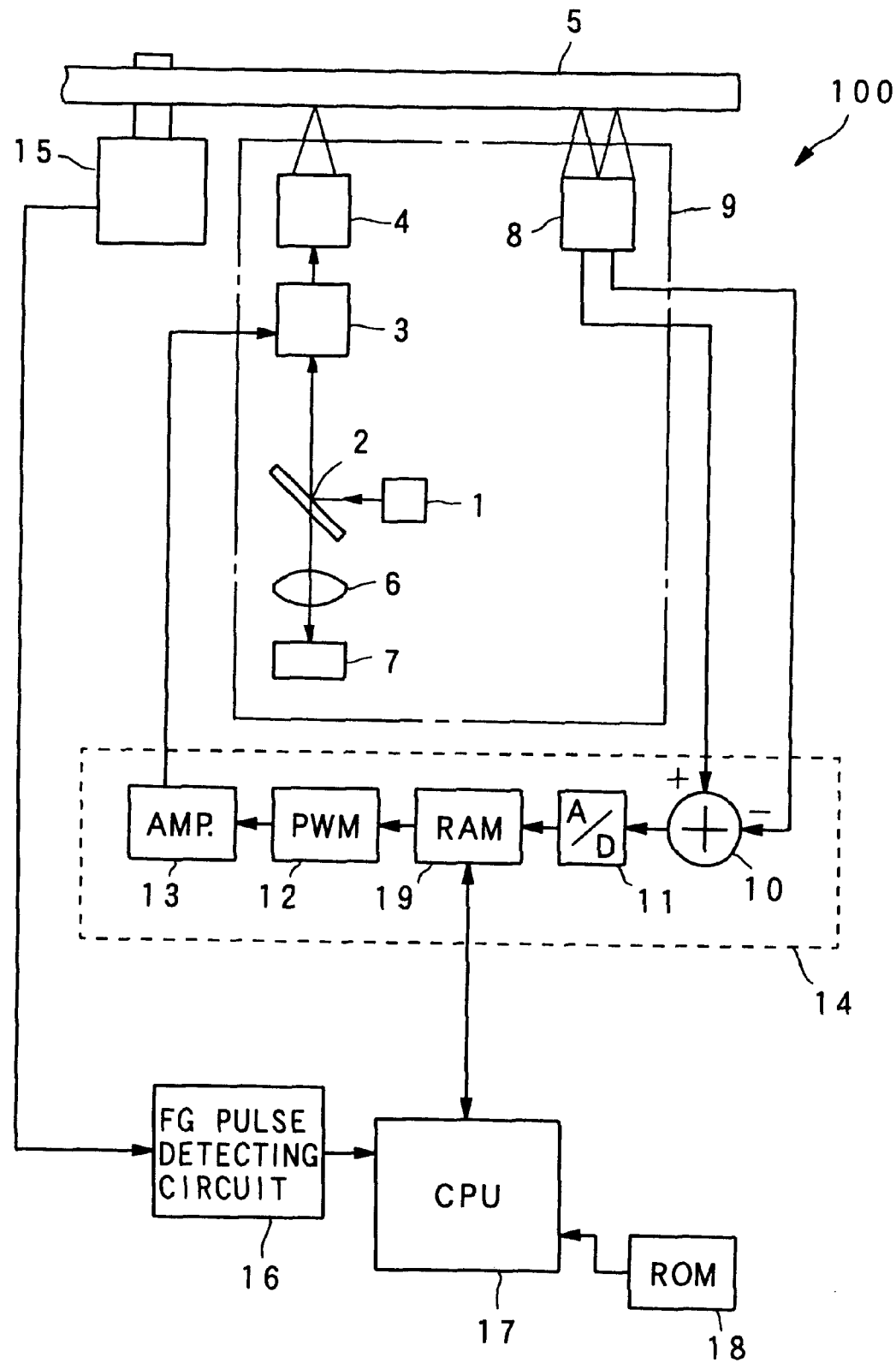
FIG. 1 is a block diagram showing an optical disc reproducing apparatus of a first embodiment of the present invention.

FIG. 1 is a block diagram showing an optical disc reproducing apparatus 100 of the first embodiment of the present invention.

In FIG. 1, the optical disc reproducing apparatus 100 has a pickup portion 9 for radiating a laser beam to an optical disc 5 to read information from an optical disc 5, a liquid crystal panel control circuit 14 for controlling a liquid crystal panel 3, a spindle motor 15 for rotating the optical disc 5, an FG pulse detecting circuit 16 for generating a rotation pulse signal synchronized with a rotation of the spindle motor 15, a CPU 17 and ROM 18.

The pickup portion 9 has a laser light source 1 for emitting the laser beam, a half mirror 2 for reflecting the laser beam emitted from the laser light source 1, a liquid crystal panel 3 for producing a phase difference of the light beam to compensate the aberration, an objective lens 4 for converging the light beam on the optical disc 5, a condenser lens 6 for condense the laser beam at an acceptance device 7 and a tilt sensor 8 for detecting a tilt of the optical disc 5. The liquid crystal panel control circuit 14 has an adder 10, an A/D converter 11, a PWM 12, an amplifier 13, and a RAM 19.

In operation, the laser beam emitted from the laser light source 1 is reflected in the half mirror 2. Then, the laser beam reflected in the half mirror 2 goes through the liquid crystal panel 3 and is converged by the objective lens 4. Therefore, a beam spot is generated on an information recording surface of the optical disc 5. Further, the laser beam reflected in the information recording surface of the optical disc 5 goes through the objective lens 4 and the liquid crystal panel 3, and penetrates through the half mirror 2. Then, the laser beam goes into the acceptance device 7 through the condenser lens 6. Therefore, an image is formed on the acceptance device 7.

On the other hand, a tilt error voltage outputted from the tilt sensor 8 to detect the tilt of the optical disc 5 is supplied into a liquid crystal panel control circuit 14. Then, the liquid crystal panel control circuit 14 outputs the liquid crystal panel control voltage proportional to the tilt error voltage. The liquid crystal panel control voltage is applied into the liquid crystal panel 3. Therefore, in the liquid crystal panel 3, the liquid crystal is performed and a phase difference is produced to compensate the aberration, such as the wave aberration.

The FG pulse detecting circuit 16 has: a light switch installed on a rotor and stator of the spindle motor 15; a waveform generating circuit; and so on. The FG pulse detecting circuit 16 outputs a rotation pulse signal corresponding to a rotation angle of the optical disc 5. For example, the FG pulse detecting circuit 16 outputs the rotation pulse signal each time the optical disc 5 is rotated 45 degrees or 90 degrees. The rotation pulse signal outputted from the FG pulse detecting circuit 16 is supplied to the CPU 17. The CPU 17 calculates a rotation number and a rotation angle from an initial position, and stores them into the RAM 19.

The tilt sensor 8 included in the pickup portion 9 detects the tilt of the optical disc 5 generated by a curve of an information recording surface of the optical disc 5 etc. The tilt sensor 8 is a light sensor having a light emission portion and two acceptance portions. The acceptance portions are disposed at different positions each other. The light emission portion emits a light to the information recording surface of the optical disc 5. The light emitted from the light emission portion reflects in the information recording surface of the optical disc 5, and the reflective lights are accepted by the two acceptance portion. Then, each of the acceptance portions converts the reflective light into a voltage corresponding to the reflective light, and outputs the voltage. Thus, Two output voltages according to the tilt of the optical disc 5 are obtained by the tilt sensor 8.

Here, in order to detect a curve (tilt) of the surface of the optical disc 5 in the radial direction of the optical disc 5, a radial tilt sensor is required. In the radial tilt sensor, a light emission portion and two acceptance portions are arranged so as to detect the curve of the surface of the optical disc 5 in the radial direction of the optical disc 5. On the other hand, in order to detect a curve of the surface of the optical disc 5 in the rotation direction (tangential direction) of the optical disc 5, a tangential tilt sensor is required. In the tangential tilt sensor, a light emission portion and two acceptance portions are arranged so as to detect the curve of the surface of the optical disc 5 in the tangential direction of the optical disc 5. The optical disc reproducing apparatus of the first embodiment has either of the radial tilt sensor or the tangential tilt sensor.

One of the output voltages outputted from the tilt sensor 8 is inputted in a plus side of the adder 10, and the other is inputted in a minus side of the adder 10. The output voltage inputted in the minus side of the adder 10 becomes negative voltage. The adder 10 adds the output voltages to each other, and outputs a difference of them as a tilt error voltage.

For example, if two output voltages outputted form the tilt sensor 8 are equal to each other, the tilt error voltage is a zero. This means that there is no the tilt of the optical disc 5. On the other hand, if two output voltages outputted form the tilt sensor 8 are different from each other, the tilt error voltage is other than zero. This means that there is the tilt of the optical disc 5. The amount of the tilt error voltage corresponds to the amount of the tilt of the optical disc 5.

The tilt error voltage outputted from the adder 10 is converted into the digital value by the A/D converter 11, and is stored into the RAM 19. At this time the storage of the tilt error voltage is synchronized with the rotation pulse signal outputted from the FG pulse detecting circuit 16. Namely, the tilt error voltage is stored into the RAM 19 each time the rotation pulse signal is outputted from the FG pulse detecting circuit 16.

The liquid crystal panel included in the pickup portion 9 has two transparent glass substrates. The transparent glass substrates are opposite to each other. A transparent electrode, such as ITO or the like, and a polarization layer are formed on an inside surface of each transparent glass substrate. Further, liquid crystal having birefringence (double refraction), such as a nematic liquid crystal or the like, is sandwiched between the polarization layers formed on the transparent glass substrates respectively.

Figure 2:
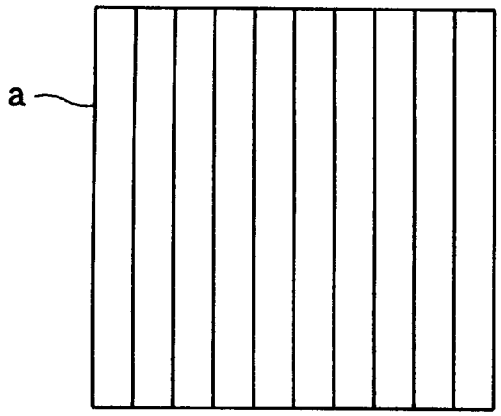
FIG. 2 is a diagram showing dividing patterns of transparent electrode of the liquid crystal panel according to the first embodiment.
Figure 2:
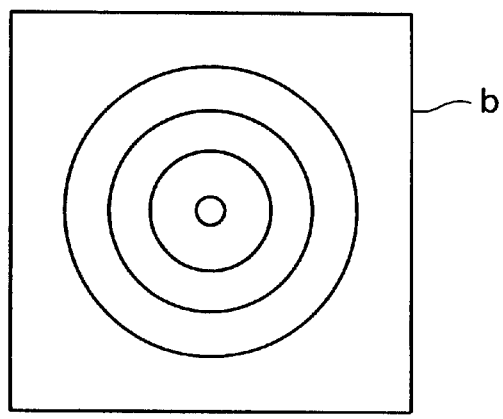
Figure 2:
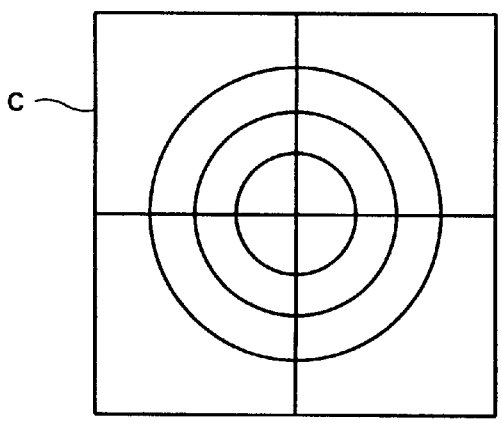
Figure 2:
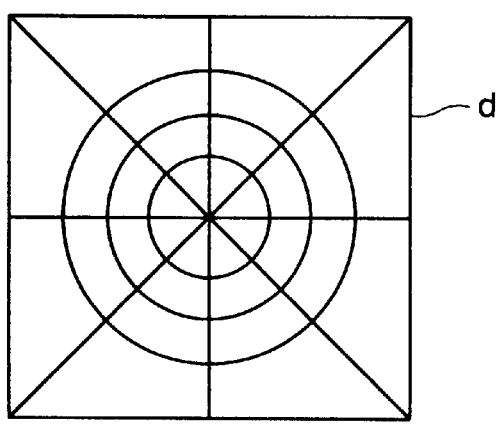
Figure 2:
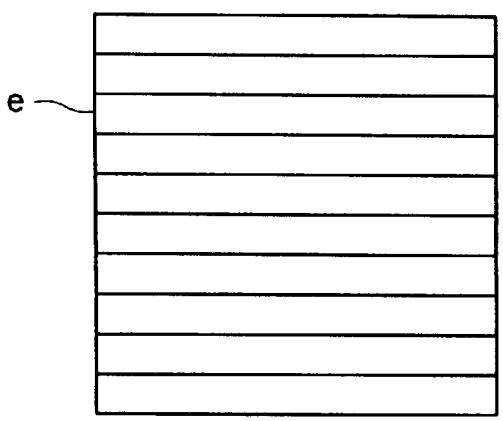
Figure 2:
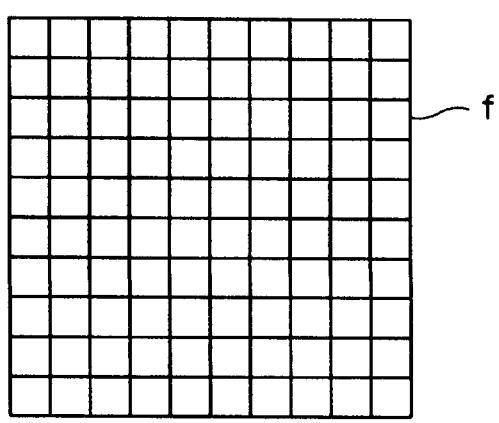

The transparent electrode formed on one of the transparent glass substrates is divided into plural electrode elements. On every one of the electrode elements, a liquid crystal panel driving circuit is installed. Each liquid crystal panel driving circuit is controlled by the tilt error voltage supplied from the liquid crystal panel control circuit 14. Some examples of dividing patterns a to f of the transparent electrode are shown in FIG. 2.

The liquid crystal sandwiched between two transparent glass substrates has birefringence. Namely, the liquid crystal has a property that its refractive index N in a direction of an optical axis of a liquid crystal molecules and its refractive index N in a direction perpendicular to the optical axis are different from each other. Further, in the liquid crystal panel 3, directions of the liquid crystal molecules are changed between horizontal alignment and vertical alignment, according to the change of voltages applied to the transparent electrodes.

As mentioned above, the refractive index N of the liquid crystal panel 3 can be changed for each its divided part (electrode element). Therefore, the liquid crystal 3 can produce optical path difference $\Delta N \cdot d$, i.e., phase difference $\Delta N \cdot d (2\pi/\lambda)$ of the light beam passing through each divided part. In addition, "$\Delta N$" means the change of refractive index, "d" means the thickness of the liquid crystal, and "$\lambda$" means the wavelength of the light beam. Therefore, if voltages applying to the divided parts are controlled according to an aberration generated in the objective lens 4, the refractive index of the liquid crystal 3 can be adjusted, and the aberration generated in the objective lens 4 can be compensated. Further, when there is a tilt of the optical disc 5, the wave aberration, such as coma aberration, is occurred. In this case, the tilt of the optical disc 5 is detected by the tilt sensor 8, the liquid crystal panel 3 is performed according to the output of the tilt sensor 8, and the phase difference is produced in the light beam. Therefore, the wave aberration caused by the tilt of the optical disc 5 can be removed.

Namely, if the tilt error voltage is applied to each of the liquid crystal panel driving circuits of the liquid crystal panel 3, the electrode elements can be controlled separately, and the refractive index of each electrode element can be adjusted. Thus, the wave aberration can be compensated.

In addition, a dividing direction of the transparent electrode of the liquid crystal panel 3 is decided according to the type of the tilt sensor 8. If the radial tilt sensor is used as the tilt sensor 8, a radial liquid crystal panel, which has a transparent electrode divided in the direction perpendicular to the radial direction of the optical disc 5 mounted on the reproducing apparatus 100, is required. If the tangential tilt sensor is used as the tilt sensor 8, a tangential liquid crystal panel, which has a transparent electrode divided in the direction parallel to the radial direction of the optical disc 5 mounted on the reproducing apparatus 100, is required.

The operation of the optical disc reproducing apparatus 100 will be explained with reference to FIG. 1.

After the operation of the optical disc reproducing apparatus 100 is started, firstly, the CPU 17 reads out control programs, various kinds of initial values, a response delay time data of the liquid crystal panel 3 and so on from the ROM 18. These data and programs are stored in the ROM 18 in advance. Then, the CPU 17 initializes the operations of the pickup portion 9 and the liquid crystal control circuit 14.

Then, the optical disc 5 is rotated, the laser beam is emitted from the pickup portion 9, and the light spot is formed on the information recording surface of the optical disc 5. Further, the tilt sensor 8 is performed. If the radial tilt sensor is used as the tilt sensor 8, the signals (output voltages) outputted from the tilt sensor 8 are supplied into the adder 10, and these signals are added to each other. Therefore, a radial tilt error voltage is obtained. The radial tilt error voltage means the tilt error voltage corresponding to the amount of tilt of the optical disc 5 in the radial direction of the optical disc 5. On the other hand, if the tangential tilt sensor is used as the tilt sensor 8, the signals (output voltages) outputted from the tile sensor 8 are supplied into the adder 10, and these signals are added to each other. Therefore, a tangential tilt error voltage is obtained. The tangential tilt error voltage means the tilt error voltage corresponding to the amount of tilt of the optical disc 5 in the tangential direction of the optical disc 5.

Further, the tilt error voltage supplied from the tilt sensor 8 is converted into a digital value by the A/D converter 11, and is stored into the RAM 19. Along with these operation, the FG pulse detecting circuit 16 detects rotation angles of the optical disc 5, and outputs the rotation pulse signal to the CPU 17. Then, CPU 17 calculates rotation numbers and rotation angles on the basis of the rotation pulse signal, and outputs these data as a counting data. Then, the counting data are stored into the RAM 19.

At this time, the digital value of the tilt error voltage and the counting data of the rotation number and the rotation angle are connected with each other, and these value and data are stored into the RAM 19 as one unit.

For example, the rotation pulse is outputted from the FG pulse detecting circuit 16 for each time the optical disc 5 is rotated 45 degrees. Concretely, the rotation pulse is outputted when the rotation angle of the optical disc 5 is 0 degree ($\theta 1$), 45 degrees ($\theta 2$), 90 degrees ($\theta 3$), and so on. Therefore, the counting data is calculated for each 45 degrees. Further, the digital value of the tilt error voltage is stored into the RAM 19 each time the counting data is calculated. That is to say, the digital value of the tilt error voltage and the counting data are synchronized with each other, and both are stored into the RAM 19 at the same time.

Further, after each one rotation of the optical disc 5, the digital value of the tilt error voltage obtained at the time of the same rotation angle is stored at the same memory location in the RAM 19. Namely, the digital data of the tilt error voltage are replaced for each one rotation of the optical disc 5.

In addition, in the embodiment, the digital value of the tilt error voltage is stored for every 45 degrees rotation of the optical disc 5. The storage cycle of the tilt error voltage is not restricted. Namely, the digital value of the tilt error voltage may be stored for every more or less than 45 degrees rotation of the optical disc 5. Further, the digital value of the tilt error voltage may be stored each time an FG pulse is generated.

In this manner, in the optical disc reproducing apparatus 100 of the embodiment of the present invention, the tilt error voltages obtained during one rotation of the optical disc 5 are memorized. That is to say, the tilt error voltages included in one track of the optical disc 5 are memorized. In addition, on the optical disc, pits are generally arranged in spiral form or coaxial form. In such an optical disc, "one track" means one round or one circle.

Next, when information recorded on the $N^{th}$ track of the optical disc 5 are read, the CPU 17 reads out the response delay time data of the liquid crystal panel 3 stored in the ROM 18, and controls the RAM 19 so as to output the tilt error voltage of the $(N-1)^{th}$ track of the optical disc 5, which is already stored in the RAM 19 as the digital value. At this time, the CPU 17 advances the output timing of the tilt error voltage of the $(N-1)^{th}$ track by a time corresponding to the response delay time on the basis of the response delay time data.

Namely, when information recorded on the $N^{th}$ track of the optical disc 5 are read, the tilt error voltage of the $(N-1)^{th}$ track of the optical disc 5 is outputted from the RAM 19 to the PWM 12, and this output timing is advanced a time corresponding to the response delay time of the liquid crystal panel 3. That is to say, the output timing of the tilt error voltage of the $(N-1)^{th}$ track is earlier than the reading timing of information recorded on the $N^{th}$ track by a time corresponding to the response delay time of the liquid crystal panel 3.

The PWM 12 changes a pulse width of a pulse signal in accordance with the digital value of the tilt error voltage supplied from the RAM 19. Further, the pulse signal is converted into an analog signal by a low pass filter (not shown in figures), and is supplied to the amplifier 13. The amplifier 13 amplifiers the analog signal corresponding to the tilt error voltage, and outputs the analog signal to the liquid crystal panel driving circuits of the liquid crystal panel 3.

Here, since the amounts of a tilt of the optical disc is not greatly changed between tracks adjacent to each other, the tilt error voltage of the $N^{th}$ track and the tilt error voltage of the $(N-1)^{th}$ track are very strongly relation to each other. Namely, the tilt of the $N^{th}$ track of the optical disc 5 and the tilt of the $(N-1)^{th}$ track of the optical disc 5 are substantially equal to each other on the same radius of the optical disc 5. Therefore, when the tilt error voltage of the $(N-1)^{th}$ track is supplied to the liquid crystal panel 3, the liquid crystal panel 3 properly operates similarly to the operation when the tilt error voltage of the $N^{th}$ track is supplied to the liquid crystal panel 3. Thus, a tilt servo control can be properly performed, and the compensation of the aberration can be correctly carried out.

Further, as mentioned above, a liquid crystal generally has a response delay. Therefore, the liquid crystal performs after the response delay time is elapsed since the tilt error voltage is supplied. Thus, if the timing of supplying the tilt error voltage is advanced by a time corresponding to the response delay time, the response delay of the liquid crystal can be canceled. From the point of view, in the optical disc reproducing apparatus 100, the tilt error voltage of the $(N-1)^{th}$ track is stored into the RAM 19, and when this tilt error voltage is outputted from the RAM 19 to the liquid crystal panel 3, the output timing of this tilt error voltage is advanced a time corresponding to the response delay time. Thus, the tilt servo control can be carried out by using the present tilt error voltage, and the influence of the response delay of the liquid crystal panel can be removed.

As mentioned above, according to the optical disc reproducing apparatus 100 of the embodiment of the present invention, aberration caused by a tilt of an optical disc 5 can be correctly compensated without an influence of the response delay of the liquid crystal.

2. Second Embodiment

Figure 3:
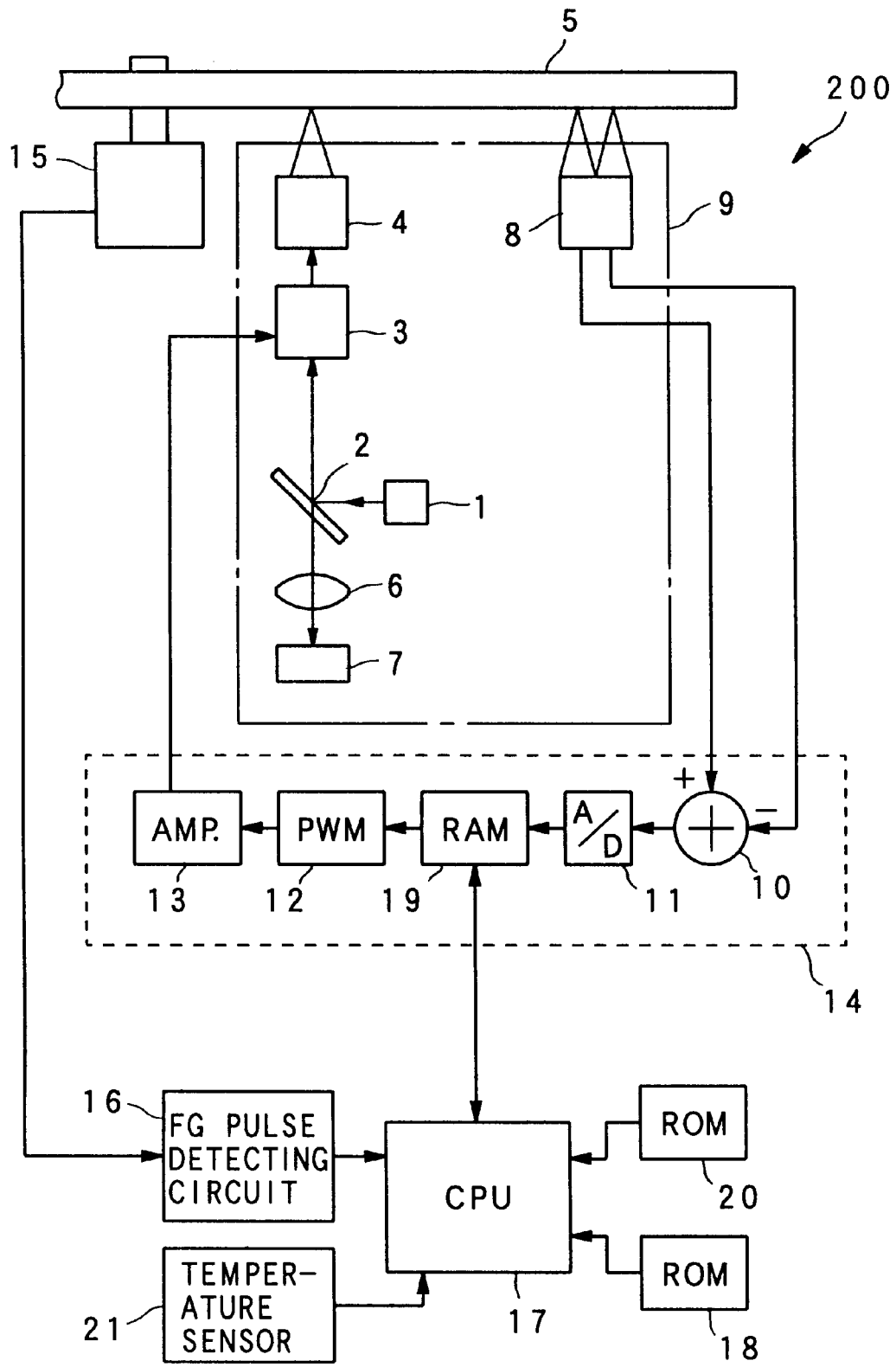
FIG. 3 is a block diagram showing an optical disc reproducing apparatus of a second embodiment of the present invention.

FIG. 3 is a block diagram showing an optical disc reproducing apparatus 200 of the second embodiment of the present invention. In FIG. 3, the same constructional elements as those in FIG. 1 carry the same reference numbers, and the explanations thereof are omitted.

The optical disc reproducing apparatus 200 of the second embodiment has a temperature sensor 21. The response delay time of the liquid crystal panel 3 is change with ambient temperature of the liquid crystal panel 3. Therefore, in order to improve the ability to compensate the aberration of the tilt of the optical disc 5, the ambient temperature of the liquid crystal 3 is measured by the temperature sensor 21, and the correct response delay time is recognized.

Figure 4:
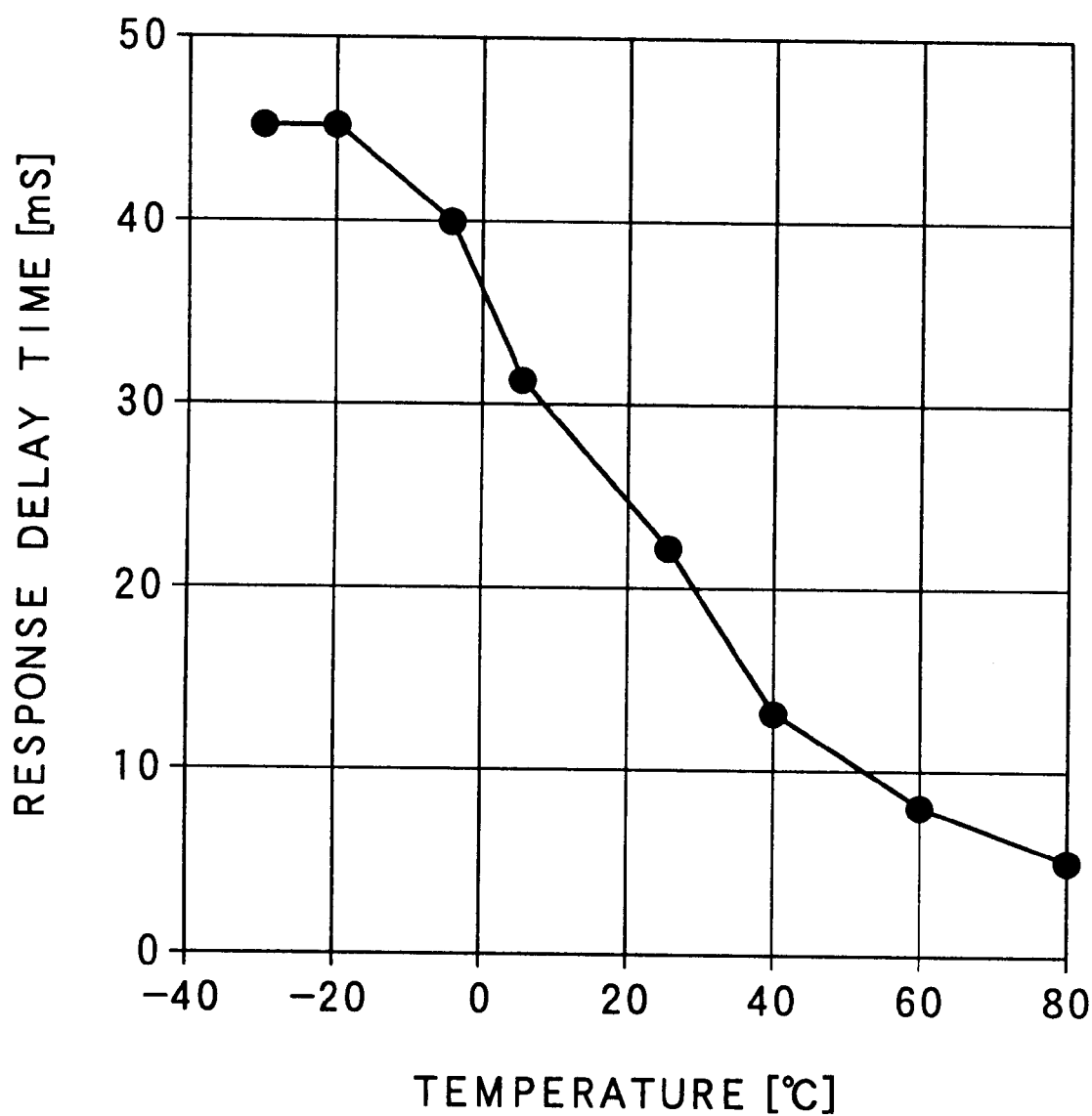
FIG. 4 is a graph showing a relation between a response delay time of the liquid crystal panel and ambient temperature according to the second embodiment.

Here, FIG. 4 is a graph of a response characteristic showing a relation between the change of temperature and the change of the response delay time of the liquid crystal. In FIG. 4, the ordinate indicates the response delay time [mS], the abscissa indicates temperature [°C]. FIG. 4 shows that the response delay time of the liquid crystal panel 3 increases when the ambient temperature drops, and the response delay time of the liquid crystal panel 3 decreases when the ambient temperature rises.

The optical disc reproducing apparatus 200 also has data of the response characteristic of the liquid crystal shown in FIG. 4 by storing them into the ROM 20 in advance. More concretely, the data of the response characteristic of the liquid crystal are stored into the ROM 20 as digital data. Namely, approximate values of the response delay time are calculated for each range of temperature, such as $-20[°C]$ ($\alpha 1$), $0[°C]$($\alpha 2$), $20[°C]$($\alpha 3$), $40[°C]$($\alpha 4$), $60[°C]$($\alpha 5$), and the calculated approximate values are stored into the ROM 20 as digital data. For example, the approximate vales of the response delay time in the range of temperature of 20±5[°C] is about 24 [mS], and the approximate vales of the response delay time in the range of temperature of 40±5[°C] is about 13 [mS].

In addition, each range of temperature is decided according to a measuring precision of the temperature sensor 21.

The temperature sensor 21 is positioned near the liquid crystal panel 3. Therefore, the temperature sensor 21 can correctly measure the ambient temperature of the liquid crystal panel 3. The temperature sensor 21 outputs the output data corresponding to the ambient temperature of the liquid crystal panel 3 to the CPU 17.

As mentioned above, according to the optical disc reproducing apparatus 200 of the second embodiment of the present invention, when the response delay time of the liquid crystal panel 3 is changed with ambient temperature of the liquid crystal panel 3, the aberration of the tilt of the optical disc 5 can be correctly compensated.

3. Third Embodiment

Figure 5:
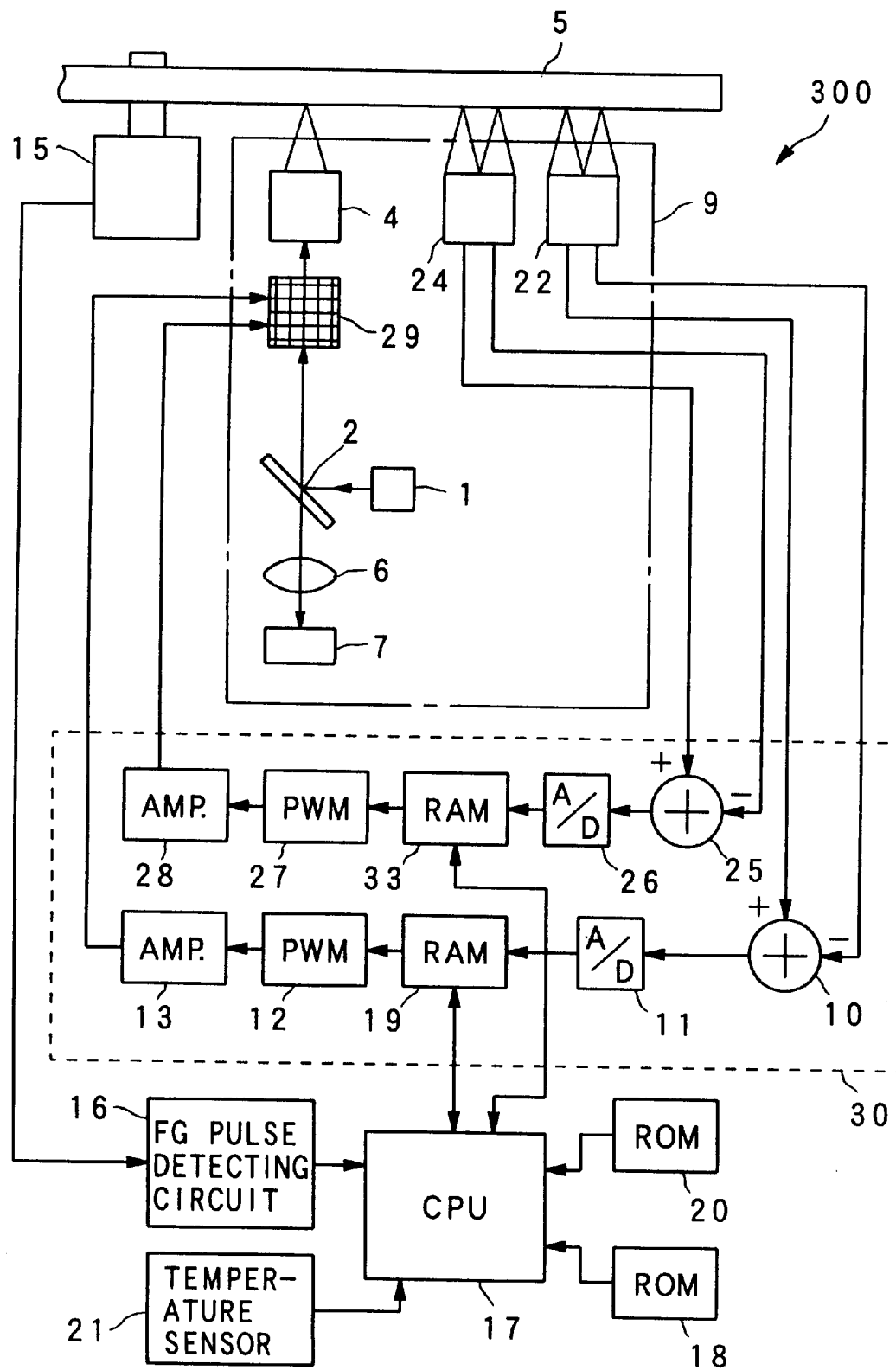
FIG. 5 is a block diagram showing an optical disc reproducing apparatus of a third embodiment of the present invention.

FIG. 5 is a block diagram showing an optical disc reproducing apparatus 300 of the third embodiment of the present invention. In FIG. 5, the same constructional elements as those in FIGS. 1 and 3 carry the same reference numbers, and the explanations thereof are omitted.

The optical disc reproducing apparatus 300 has a radial tilt sensor 22 for detecting a tilt of the optical disc 5 in the radial direction of the optical disc 5, a tangential tilt sensor 24 for detecting a tilt of the optical disc 5 in the tangential direction of the optical disc 5, and an omnidirectional liquid crystal panel 29, which is performed by a radial tilt error voltage and a tangential tilt error voltage.

As shown in FIG. 5, for the radial tilt sensor 22, the liquid crystal control circuit 30 has the adder 10, the A/D converter 11, the RAM 19, the PWM 12 and the amplifier 13. For the tangential tilt sensor 24, the liquid crystal control circuit 30 further has an adder 25, an A/D converter 26, a RAM 33, a PWM 27 and an amplifier 28. The liquid crystal control circuit 30 outputs two kinds of tilt error voltages, i.e., the radial tilt error voltage and the tangential tilt error voltage toward the omnidirectional liquid crystal panel 29.

One of the transparent electrode of the omnidirectional liquid crystal panel 29 is divided into the plural electrode elements arranged in a matrix. Further, the omnidirectional liquid crystal panel 29 has a matrix driving circuit. The matrix driving circuit synthesizes the radial tilt error voltage and the tangential tilt error voltage supplied from the liquid crystal control circuit 30, and controls each of the electrode elements.

As mentioned above, according to the optical disc reproducing apparatus 300, the tilt of the optical disc 5 in the radial direction is detected by the radial tilt sensor 22, the radial tilt error voltage is generated by the adder 10, and the radial tilt error voltage is stored into the RAM 19. Further, the radial tilt error voltage of the $(N-1)^{th}$ track of the optical disc 5 stored in the RAM 19 is outputted toward the omnidirectional liquid crystal panel 29 when information recorded on the $N^{th}$ track are read. At this time, the output timing of the radial tilt error voltage of the $(N-1)^{th}$ track is advanced a time corresponding to the response delay time of the omnidirectional liquid crystal panel 29. Along with these operation, the tilt of the optical disc 5 in the tangential direction is detected by the tangential tilt sensor 24, the tangential tilt error voltage is generated by the adder 26, and the tangential tilt error voltage is stored into the RAM 33. Further, the tangential tilt error voltage of the $(N-1)^{th}$ track of the optical disc 5 stored in the RAM 33 is outputted toward the omnidirectional liquid crystal panel 29 when information recorded on the $N^{th}$ track are read. At this time, the output timing of the tangential tilt error voltage of the $(N-1)^{th}$ track is advanced a time corresponding to the response delay time of the omnidirectional liquid crystal panel 29. Further, the omnidirectional liquid crystal panel 29 produces the phase differences in the light beam passing through the liquid crystal on the basis of the radial tilt error voltage and the tangential tilt error voltage of the $(N-1)^{th}$ track. Therefore, both of the aberration caused by the tilt of the optical disc 5 in the radial direction and the aberration caused by the tilt of the optical disc 5 in the tangential direction are correctly compensated.

In addition, in the aforementioned embodiments, when information recorded on the $N^{th}$ track of the optical disc 5 are read, the tile error voltage of the $(N-1)^{th}$ track is used for driving the liquid crystal panel. However, when the information recorded on the $N^{th}$ track are read, the tilt error voltage of the $(N-2)^{th}$, $(N-3)^{th}$ or $(N-\alpha)^{th}$ track (N and a are integer.) may be used for driving the liquid crystal panel. As mentioned above, the amount of the tilt of the optical disc is not greatly change in some tracks adjacent to each other. Therefore, as long as the amount of the tilt of the optical disc is not change, any track positioned the inside of the $N^{th}$ track is used for driving the liquid crystal panel when the information recorded on the $N^{th}$ track, if information are read from inner circumference to outer circumference of the optical disc. In this case, only the tilt error voltage of the $(N-\alpha)^{th}$ track may be stored in the RAM 19 or 33, or all of the tile error voltages between the $(N-\alpha)^{th}$ track and the $N^{th}$ track may be stored in the RAM 19 or 33.

Further, if information are read from outer circumference to inner circumference of the optical disc, when information recorded on the N track are read, the tilt error voltage of the $(N+1)^{th}$, $(N+2)^{th}$ or $(N+\alpha)^{th}$ may be used for driving the liquid crystal panel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tilt servo system for performing a servo control in order to compensate an aberration caused by a tilt of an optical disc, comprising:

a pickup for radiating a laser beam onto each track of the optical disc, the pickup comprising a laser light source for emitting the laser beam, an objective lens for converging the emitted laser beam on the optical disc, and a liquid crystal panel positioned on an optical axis of the emitted laser beam in order to compensate the aberration;

a tilt sensor for detecting the tilt of the optical disc, and for outputting a detection signal corresponding to the tilt of the optical disc;

a storage device for storing the detection signal corresponding to the tilt of an $(N-\alpha)^{th}$ track of the optical disc outputted from the tilt sensor;

a controller for controlling the liquid crystal panel on the basis of the detection signal corresponding to the tilt of the $(N-\alpha)^{th}$ track of the optical disc stored in the storage device when the pickup radiates the laser beam onto an $N^{th}$ track of the optical disc.

2. A tilt servo system according to claim 1, wherein, in the storage device, a storage of the detection signal is synchronized with a rotation of the optical disc.

3. A tilt servo system according to claim 1, wherein the controller controls the liquid crystal panel by outputting the detection signal corresponding to the tilt of the $(N-\alpha)^{th}$ track stored in the storage device to the liquid crystal panel, and the controller advances an output timing of the detection signal by a time corresponding to a response delay time of the liquid crystal panel.

4. A tilt servo system according to claim 3, further comprising:

a temperature sensor for measuring an ambient temperature of the liquid crystal panel, wherein the controller changes the output timing of the detection signal according to the ambient temperature of the liquid crystal panel.

5. A tilt servo system according to claim 4, further comprising:

a delay time storage device for storing data with respect to a relation between the response delay time of the liquid crystal panel and the ambient temperature of the liquid crystal panel.

6. A tilt servo system according to claim 1, further comprising:

a rotation detecting device for detecting a rotation angle of the optical disc, and for outputting a rotation angle signal, wherein the storage device stores the detection signal outputted from the tilt sensor each time the rotation angle signal is outputted from the rotation detecting device.

7. A tilt servo system according to claim 1, wherein the tilt sensor detects the tilt of the optical disc in a radial direction of the optical disc.

8. A tilt servo system according to claim 1, wherein the tilt sensor detects the tilt of the optical disc in a tangential direction of the optical disc.

9. A tilt servo system according to claim 1, wherein the tilt sensor comprises a first tilt sensor for detecting the tilt of the optical disc in a radial direction of the optical disc, and a second tilt sensor for detecting the tilt of the optical disc in a tangential direction of the optical disc.

* * * * *